UNITED STATES PATENT OFFICE.

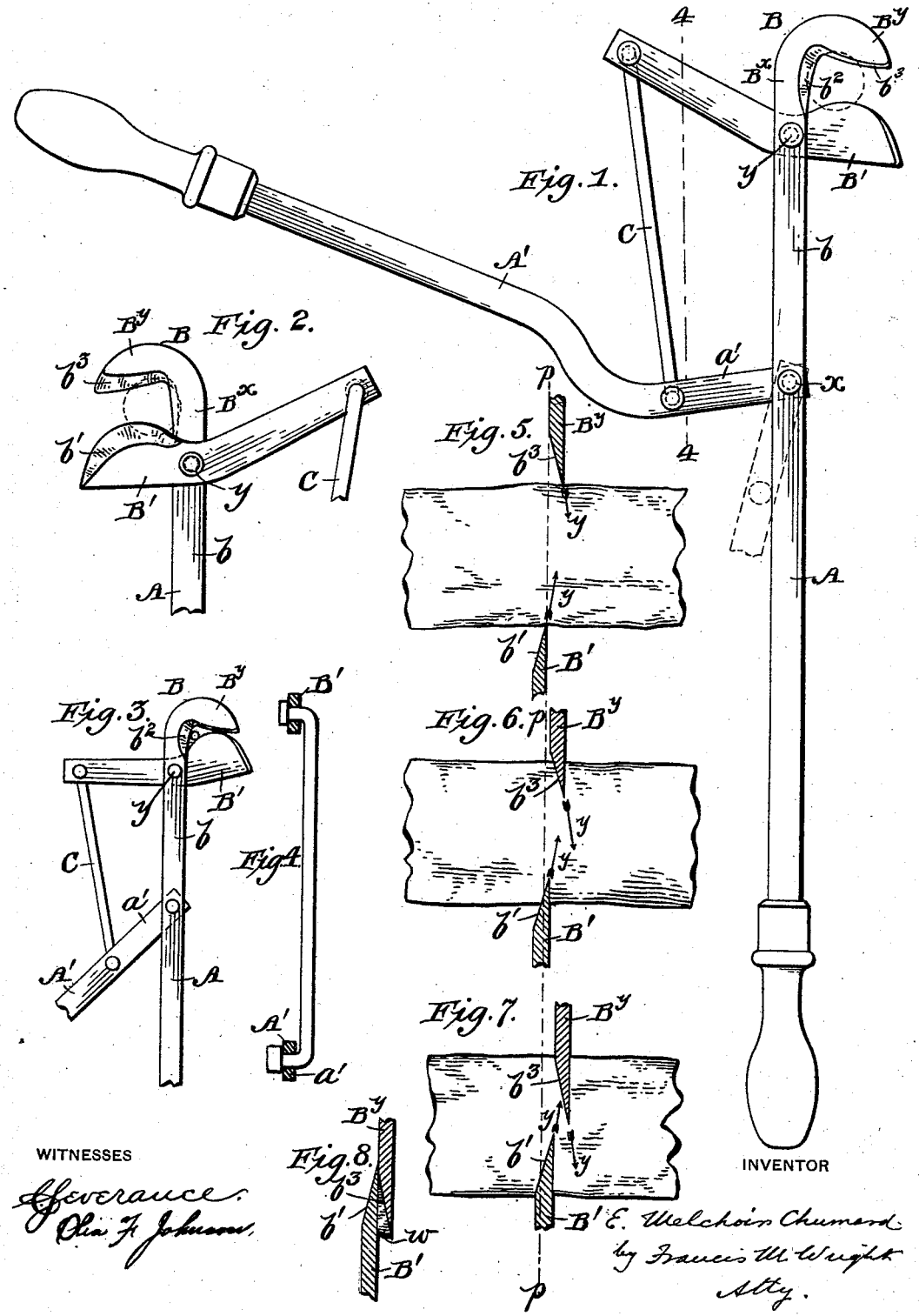

EDMUND MELCHOIR CHUMARD, OF BROOKLYN, PENNSYLVANIA.

TREE-TRIMMER.

SPECIFICATION forming part of Letters Patent No. 578,316, dated March 9, 1897.

Application filed June 4, 1892. Serial No. 435,531. (No model.)

*To all whom it may concern:*

Be it known that I, EDMUND MELCHOIR CHUMARD, a citizen of the United States, and a resident of Brooklyn, in the county of Susquehanna and State of Pennsylvania, have invented certain new and useful Improvements in Tree-Trimmers, of which the following is a specification.

My invention relates to improvements in shears or cutters employed for trimming trees; and the objects of my invention are, first, to bevel the cutting edges of the shears in the most advantageous manner possible, so as to eliminate the resistance which has hitherto, in shears as at present constructed, been encountered by reason of the "wedging" action of the bevels in passing through thick branches; secondly, to dispose the cutting edges in such a manner in relation to the branch to be severed as to utilize the advantageous principle of the draw cut thereon in as high a degree as possible and also the principle of the wedge; thirdly, to so dispose the cutting edges that thick branches or limbs will be acted upon by blades suitably beveled for the severance of thick branches, while smaller branches or twigs will be engaged and operated upon by other blades better adapted for cutting such smaller twigs; fourthly, to provide suitable connecting-leverage which will admit of very large branches being introduced between the cutting-jaws and will at the same time multiply the power applied to a greater degree than has hitherto been attained, and, fifthly, to supply a light, simple, and efficient link between the movable cutting edge and the movable handle or lever which shall also serve as a stop for preventing the too-close approach of the handles of the operating-levers upon the close of the cut, and consequent nipping of the hands of the operator.

In the accompanying drawings, Figure 1 is a side view of my improved tree-trimmer, the jaws being open. Fig. 2 is a view of the cutting portion from the opposite side, showing the bevels on that side. Fig. 3 is a view of a portion of the shears, showing the jaws in the position for cutting small twigs. Fig. 4 is a detail cross-sectional view on the line 4 4 of Fig. 1 to show the combined link and stop. Figs. 5, 6, and 7 are enlarged cross-sectional views illustrating the operation of blades beveled according to my improvement, and Fig. 8 is a sectional view of the edges of the blades after the cut has been made.

A and A' are the operating handles or levers, of which I shall term A the "stationary" handle and A' the "movable" handle. These levers are pivoted at $x$, and the stationary handle A has an extended portion $b$ beyond the pivot, terminating in a hook or jaw B. Upon the extended portion $b$ is pivoted a movable jaw B', the power end of which is connected with the movable handle A' by a link C.

The above description will be equally applicable to shears in general use prior to my invention, and I will now point out the various features of novelty and utility wherein my improved shears differs from those hitherto devised.

The first improvement consists in the novel arrangement of the bevels. This is illustrated in Figs. 5, 6, 7, and 8. In Fig. 5 the line $p\,p$ represents the plane lying between or coincident with the two inner surfaces of the blades, and it is also the plane in which the edge of the lower blade, being beveled on the outside or in the ordinary manner, first contacts with the branch or limb. Now, the principle by virtue of which the blades are driven into the wood being that of the wedge and the direction of penetration of a wedge being in a plane midway between its faces, it is readily seen that the lower blade will tend to penetrate in the direction represented by the arrow $y$. Were the upper blade also beveled on its outer surface, as has heretofore been the custom, the edge of the upper blade would be in contact with the branch in the plane $p\,p$, and it would penetrate in a direction slightly inclined to the left, or parallel to the direction represented by the arrow $y$. Thus in the prior forms of shears the blades are forced across one another by the lateral pressure of the hard wood. This enforced lateral movement of the blades neutralizes a great part of the power exercised in operating the blades when cutting large branches and greatly reduces their efficiency, for, as the blades are not free to move across each other, being held by the rivet or fulcrum-bolt, the effect is to bend each blade across the other from the fulcrum to the points; but it is evident that it requires no slight expenditure of force to bend the blades of large shears, such as those used for cutting limbs of trees, and this force must be deducted from the total force exerted by the operator. Hence in this construction the power available for cutting the wood is greatly diminished. But this is not all. A still more serious drawback will be discovered after shears so constructed have been used a number of times in cutting branches of considerable thickness. It has been seen that under such circumstances the blades are forced across one another. Hence as they gradually close together in the act of cutting each edge must necessarily cut into the other.

The forward portions of the blades being held across each other by the slightly-lateral direction in which they have penetrated the hard wood, while at the pivot the relative position of the blades is unchanged, it is easily seen that a very powerful shearing action of the edge of each blade by the other takes place, and the blades are very quickly rendered blunt along a portion of their edge.

In order to avoid the very serious drawbacks attendant upon the above-described construction, some manufacturers have ceased to provide both jaws with cutting edges and have made the upper or stationary jaw with a blunt or flat edge, the movable jaw alone penetrating into the wood. This permits the blunt jaw to move or slide laterally along the surface of the branch to retain its position relative to the movable or cutting jaw, which penetrates the wood with a slightly-lateral motion, as before explained; but this construction is objectionable in that, first, it throws a much heavier strain upon the cutting-jaw as it moves through the middle of the branch than was required of either of the cutting-jaws under the former construction, and, secondly, the branch is bruised and mangled on its upper surface where the blunt jaw is drawn along it under great pressure. A clean cut is of extreme importance in pruning or trimming trees, and for this reason such shears with blunt jaws are highly objectionable. These several disadvantages I avoid by the construction of bevels now shown, wherein the lower blade is seen to have an outer bevel $b'$ or bevel on the outer surface, and the upper jaw has also an outer bevel $b^2$ on the blade $Bx$ thereof next the pivot, but the blade, $By$, farthest from the pivot has an inner or reverse bevel $b^3$. This latter blade may have the outer bevel $b^2$ in addition, but this is not necessary, although I have for some purposes found it to be advantageous. The essence of this portion of my invention, however, resides in the inner or reverse bevel $b^3$ of the outer stationary blade $By$ as opposed to the outer bevel $b'$ of the movable blade.

Returning now to Figs. 5, 6, and 7, which show cross-sections of this portion, and noting the lines along which the wedge-formed blades tend to travel, (indicated by the arrows $y$,) it will be seen that the blades do not now tend to cross each other and their edges do not grind one against the other, but pass each other without coming in contact. On examining a cut made by one of my improved shears it will be found that a thin layer of wood, as shown at $w$, Fig. 8, has been drawn in between and is retained between the blades, as shown in Fig. 8. This will in actual practice form a striking illustration of the fact that the edges of the cutting-blades do not come in contact with each other in my improved shears.

I have found that with shears constructed according to my improvement the power exerted is so usefully directed that branches can be cut by them which have heretofore been considered so large as to be impracticable to sever with shears; also that the blades of my shears retain their sharpness for a far longer period than in the old form, the reason of which has been sufficiently set forth above.

The foregoing part of my invention has been directed to an improvement in the configuration of the blades, as shown by a cross-section thereof.

My next improvement relates to the form of the blades viewed sidewise.

It is well known that a blade, as of a knife, can be caused to penetrate a hard body much more easily and effectively where the pressure into the body is accompanied by a longitudinal motion of the blade through the body, like that of a saw, than by a simple direct pressure unaccompanied by any such motion. I make a novel application of this principle to the blades of shears. Hitherto, so far as I am aware, the stationary jaw of a pair of shears has been so configured as to directly oppose the movement thereagainst of the branch under the pressure of the movable jaw. Now my improvement consists in providing two stationary jaws meeting each other and forming an internal angle, within which the branch is wedged by the movable jaw. The direction of pressure of neither of these stationary jaws is directly opposed to that of the movable jaw, and thus the branch is subjected by each stationary jaw to a draw cut instead of to a direct pressure, the branch being moved along the edge of each stationary blade, as well as pressed against it, and thus the efficiency of the shears is greatly increased.

While, for the reasons heretofore set forth, bevels on the inner sides of opposite cutting-blades are more effective and desirable for cutting large branches, such a construction is not desirable for twigs, for the reason that the cutting edges are spread so far apart as to inclose the twig between them and bend or crush the twig instead of cutting it. Cutting edges which meet close together are required for cutting small twigs. Hence the triangular arrangement of the blades or angle-like form of the stationary jaw is of great importance for this reason—that it permits large branches to be engaged by and pressed principally between the movable blade B' and the outer stationary blade B$y$, as shown in Fig. 1, while in cutting small branches or twigs the twig is principally acted upon by the blades B' and B$x$, which are of proper bevel to cut the twig. (Seen clearly in Fig. 3.) This is found to be an important advantage derived from the employment of two stationary blades disposed at an angle with each other.

Another improvement embodied in my invention is the novel arrangement of linkage and leverage whereby I obtain an increased multiplication of force. The time occupied in the operation is of comparatively small importance, and the aim should be to increase the power applied at the expense of speed.

It will be observed that the arm of the lever B' is longer than the arm $a'$ of the handle A', and also that the link C is longer than the portion $b$ between the two pivots $x$ and $y$. By these means I not only multiply the leverage very advantageously, but I dispose the movable lever and the movable jaw at such angles severally to the stationary lever that at the point where the greatest resistance is reached the lever will move through a much larger angle in the same time than does the jaw, and thus, again applying the principle of gaining power at the expense of speed, the effective power expended in the jaws is greatly increased.

A further improvement embodied in my invention resides in the combined link and stop formed all in one piece.

In my experience in the manufacture, use, and sale of pruning and trimming shears I have found the following disadvantages to attend the old construction in which the link connecting the movable lever and movable jaw is formed of a bar pierced at both ends and secured to the lever and jaw by rivets: In the first place such a construction is heavy and clumsy, for the bar must be of sufficient width to permit holes to be made through its ends. Secondly, I have found that the bolts which secure the link in place are apt to work loose and come off and are lost, and in many ways I have found that this part of the apparatus has proved unsatisfactory. To remedy these defects and at the same time form a stop for the handles, I make the link out of a round rod of iron, bending the ends and passing them through holes in the jaw and lever and enlarging the end which passes through the hole in the movable lever to form an enlarged head or stop. I have found this combined link and stop made of a single piece to be at once simple, cheap, effective, and durable, and at the same time the improvement serves to reduce the weight of the shears, a very important consideration, since every ounce of weight that can be taken off an article that has to be carried about all day is a considerable gain.

Having thus fully described my invention, what I claim, and desire to secure by Letters Patent, is—

1. A pair of shears, one of whose blades has a cutting edge with a bevel on the outside, and the other has a cutting edge with a bevel on the inside, said cutting edges being arranged to pass each other in shearing, substantially as described.

2. In a pair of shears, the combination of the blade B' having the beveled cutting edge $b'$, beveled on the outside, with the blade B having the cutting edge $b^3$ beveled on the inside, said edges being arranged to pass each other in shearing, and a pivot on which said blades turn, substantially as described.

3. In a pair of shears, the combination of a cutting-blade B' and a hook-shaped cutting-blade B having cutting edges $b^2$, $b^3$, disposed at an angle to each other, said cutting edges being beveled on opposite sides of the blade, substantially as described.

4. In a pair of shears, the combination of a cutting-blade B', and a cutting-blade B having cutting edges $b^2$ $b^3$ both disposed opposite to the cutting edge of the blade B', said edges $b^2$ $b^3$ being oppositely beveled with regard to each other, substantially as described.

5. In a pair of shears, the combination of a blade B' having its outer surface beveled at $b'$, a blade B having two cutting edges $b^2$, $b^3$ disposed at an angle to each other, said cutting edge $b^2$ being nearest the pivot of the shears and having its outer surface beveled off, and said cutting edge $b^3$ being farthest from said pivot and having its inner surface beveled off, reversely to $b^2$, and a pivot on which said blades turn, substantially as described.

6. In a pair of shears, the combination of a blade B' having its outer surface beveled at $b'$, a blade B having two cutting edges $b^2$ $b^3$ disposed at an angle to each other, said cutting edge $b^2$ being nearest the pivot of the shears and having its outer surface beveled off, and said cutting edge $b^3$ being farthest from said pivot and having its inner surface beveled off, reversely to $b^2$, a pivot on which said blades turn, an operating-lever, and a link connecting said lever with one of said blades, said link having a projecting end to form a stop when the blades are closed, substantially as described.

In witness whereof I have hereunto signed my name in the presence of two subscribing witnesses.

E. MELCHOIR CHUMARD.

Witnesses:
HENRY CONNETT,
J. D. CAPLINGER.